Nov. 18, 1952 R. F. BROUSSARD 2,618,371
PARKING METER
Filed Dec. 23, 1946 4 Sheets-Sheet 1

INVENTOR.
Robert F. Broussard
BY
Banning & Banning
Attorneys

Nov. 18, 1952 — R. F. BROUSSARD — 2,618,371
PARKING METER
Filed Dec. 23, 1946 — 4 Sheets-Sheet 2

INVENTOR.
Robert F. Broussard
BY
Attorneys

Nov. 18, 1952    R. F. BROUSSARD    2,618,371
PARKING METER
Filed Dec. 23, 1946    4 Sheets-Sheet 3
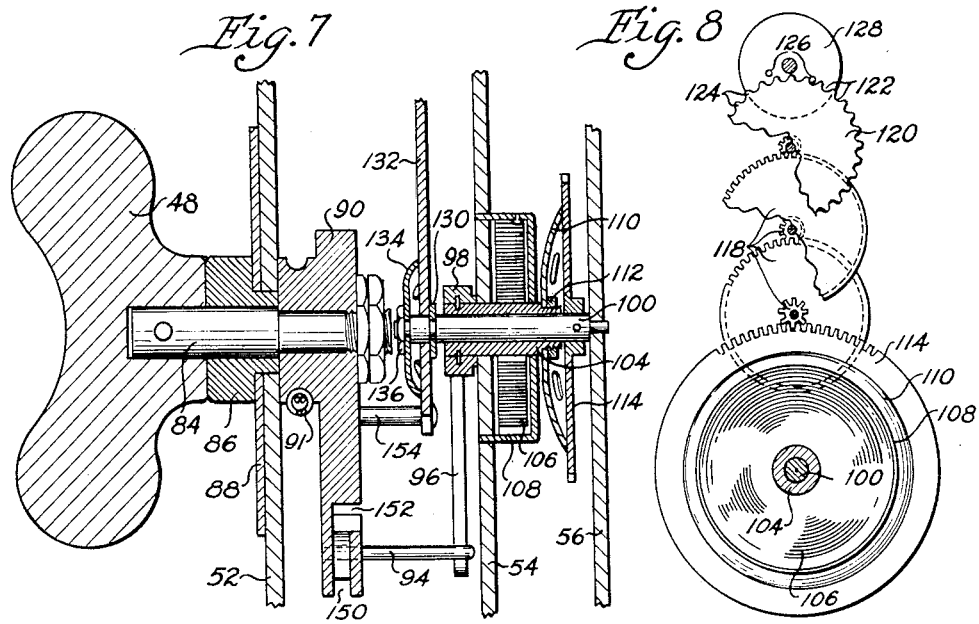
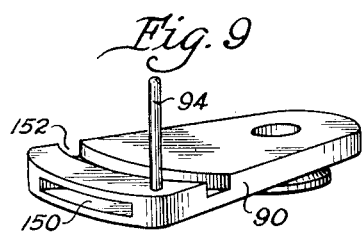
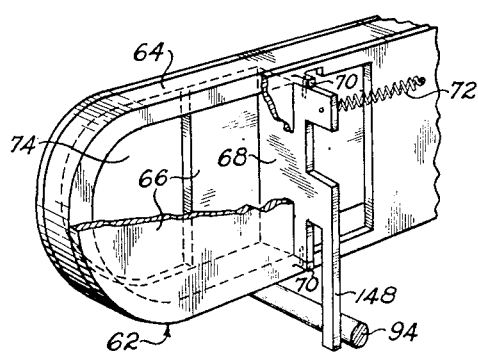
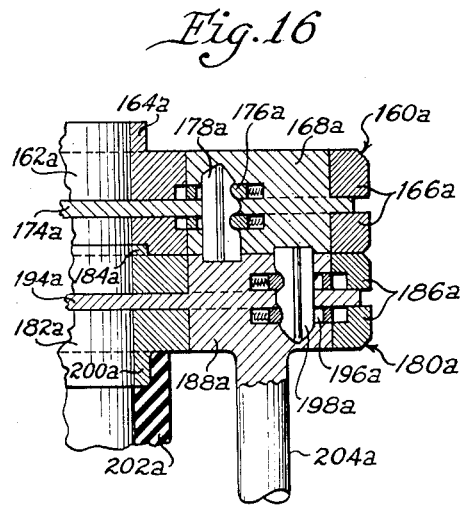
INVENTOR.
Robert F. Broussard
BY
*Banning & Bohnert*
Attorneys Nov. 18, 1952   R. F. BROUSSARD   2,618,371
PARKING METER
Filed Dec. 23, 1946   4 Sheets-Sheet 4
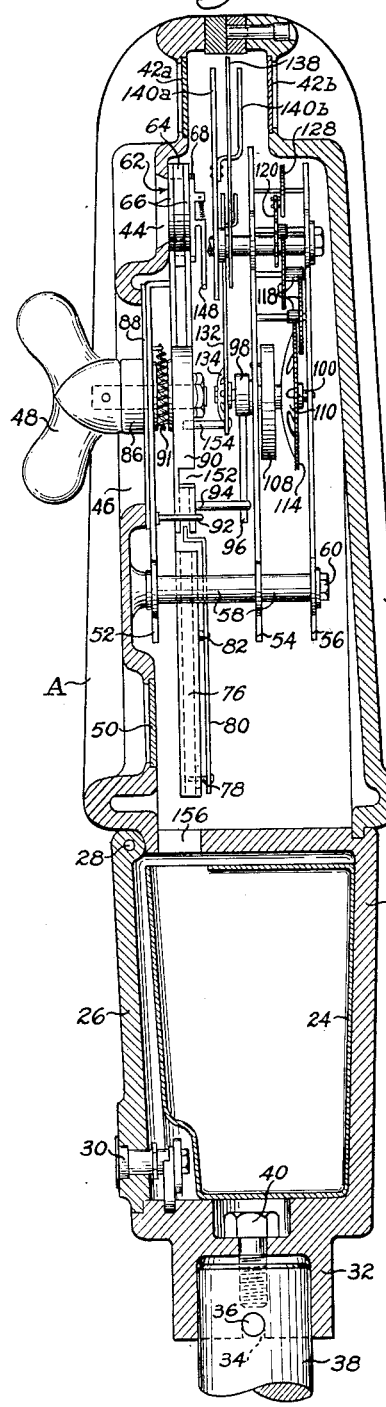
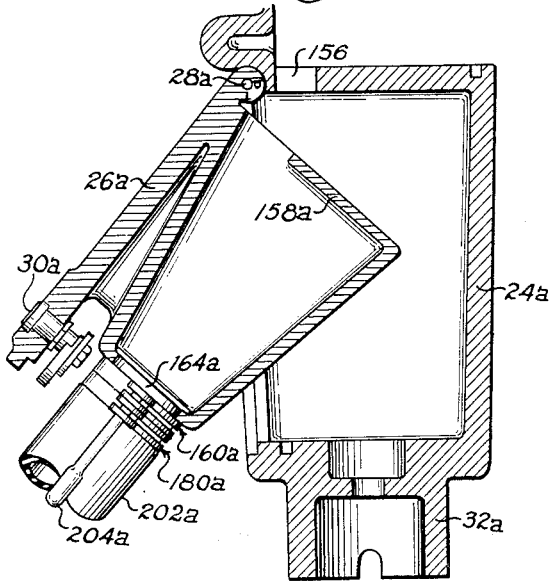
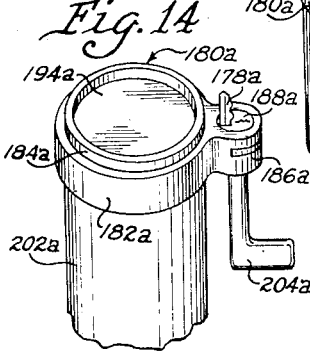
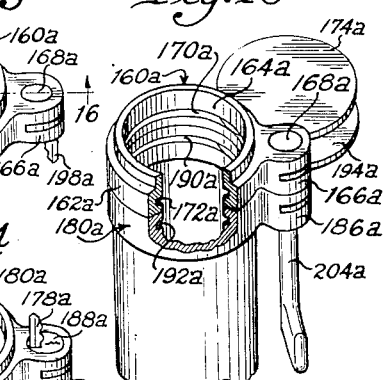
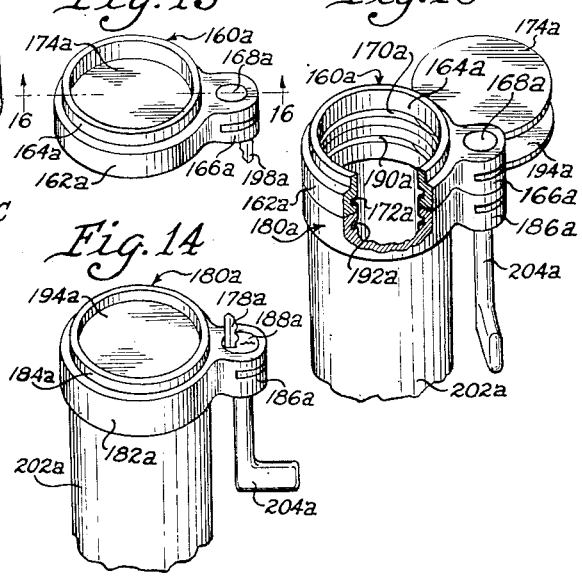
INVENTOR.
Robert F. Broussard
BY
Attorneys Patented Nov. 18, 1952

2,618,371

UNITED STATES PATENT OFFICE 2,618,371

PARKING METER

Robert F. Broussard, Houston, Tex., assignor to Duncan Parking Meter Corporation, Chicago, Ill., a corporation of Illinois Application December 23, 1946, Serial No. 717,835

11 Claims. (Cl. 194—84)

The present invention relates in general to coin controlled timing mechanisms for indicating the passage of time during a purchased period, and, in particular, to such mechanisms as are especially designed and are particularly applicable for use as parking meters.

Parking meters of the manual type generally comprise a spring-driven clockwork which is set in operation, by a motorist depositing a coin in the meter, through the operation of a crank or handle extending from the meter housing. A pointer is generally provided which is arranged to move slowly over a graduated scale to indicate the time which has elapsed since the deposit of a coin. Upon the expiration of a predetermined time interval, which may be one hour, the clockwork is arranged to release a flag to warn the motorist that another coin is required for purchase of an additional unit of time, and also apprise the officer on duty of the fact that overtime has now started.

In certain prior types of parking meters, the flag has been retained by a latch during the purchased interval in a concealed position from which it advances to a visible position with the aid of a spring when the latch is released. In such meters, slight variations in the setting of the latch, resulting from mal-adjustment or wearing of the associated parts will cause the flag to be released either before or after the lapse of the purchased time unit.

In the parking meter of the present invention, the flag is directly interconnected with the indicator or pointer so as to maintain a positive synchronism therewith. The meter is also designed to cause the flag to advance into view progressively (rather than suddenly) during a predetermined period immediately prior to expiration of the purchased time interval, so as to indicate approximately how much of such time (if any) still remains.

The parking meter of the present invention is provided with a coin carrier which is arranged to receive a deposited coin in response to the operation of a winding handle extending from the meter, and to transfer the coin to a coin box when the handle is released. The meter is designed to control the resetting of the indicator and the flag, through the deposited coin, during the restoration of the coin carrier which is spring biased to return to normal position when the operating handle is released. Thus, there is no possibility of motorists cheating by only partially operating the winding handle, as may be done with certain prior parking meters, since the winding handle must be operated fully and then released in order to reset the indicator and the flag.

The meter of the present invention is also designed to prevent the entrance of dirt, snow, rain, etc., through the coin entry slot to the mechanism inside, by the provision of a gate which normally closes the chute leading from the entry slot. The coin entry slot is furthermore designed to permit a deposited coin to be removed at any time prior to operation of the winding handle.

The timing mechanism, which is incorporated in the parking meter disclosed herein, is considerably simpler in construction than the clockworks previously used. This timing mechanism omits the usual hair spring, thereby eliminating one source of failure in the operating mechanism. As a result, there will be reduction in overall cost, simplification of assembly, and more reliable operation.

The mechanism disclosed herein is furthermore designed to permit transfer of coins from the box in which the accumulated coins are contained, to a sealed container carried by an authorized collector, while maintaining the coins inaccessible to the collector. By such a device, theft or loss of coins, chargeable to the collector, is prevented.

These and other objects of the invention can be best understood from the following description, in conjunction with the accompanying drawings wherein;

Fig. 7 is an enlarged detail in longitudinal section through the meter, illustrating certain parts in operative relation to the main shaft of the timing mechanism;

Fig. 8 is a plan view, schematic in form, of the timing mechanism included in the meter;

Fig. 9 is a perspective view of the coin carrier, showing the rear side thereof;

Fig. 10 is a perspective view of the entry to the coin chute, looking toward the rear side of the gate at that point;

Fig. 11 is a longitudinal sectional view through the meter;

Fig. 12 is an enlarged fragmentary sectional view through a meter base having a coin collection box of special construction;

Fig. 13 is a perspective view of a key controlled gate which is adapted to be permanently connected to the coin box shown in Fig. 12;

Fig. 14 is a perspective view of a key-controlled gate which mates with that shown in Fig. 13;

Fig. 15 is a perspective view illustrating the gates of Figs. 13 and 14 in assembled position, with both gates open to permit the passage of coins therethrough; and Fig. 16 is a fragmentary sectional view showing details of the gate locks, with the gates in operative relation.

Figure 1:
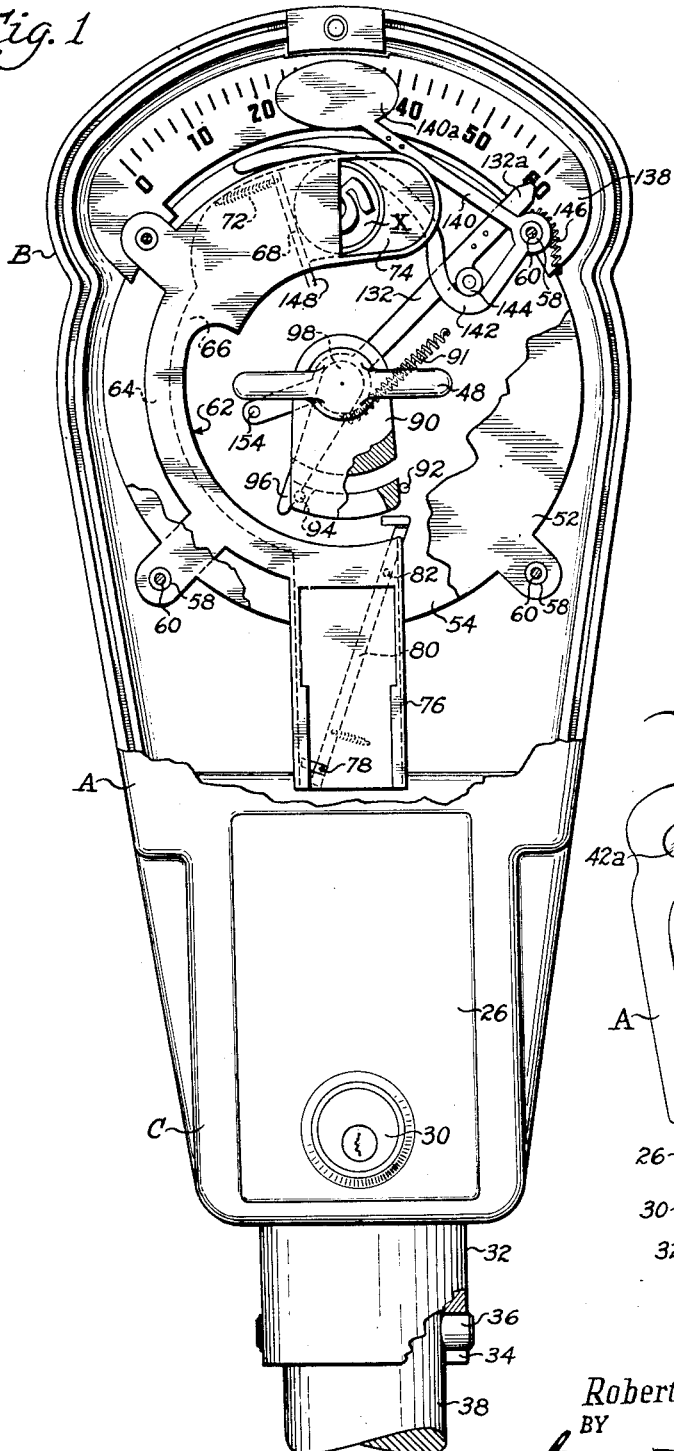
Fig. 1 is an elevational view of the parking meter as seen from the front, with certain portions omitted and others broken away to reveal details of the operating mechanism.
Figure 2:
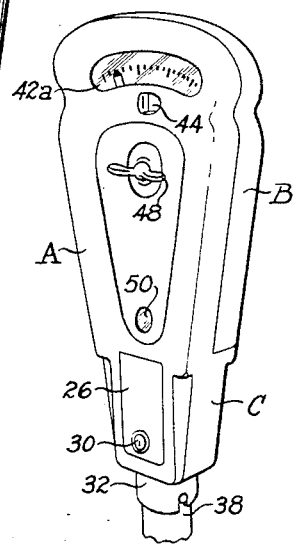
Fig. 2 is a perspective view of the meter.

Referring particularly to Figs. 1, 2, and 11, the parking meter is housed in a casing A having a rear cover B therefor, and a base C. The mechanism proper is housed in the casing to which access may be gained only when the rear cover B is removed. The base C of the casing defines a chamber for reception of a coin box 24 in which the deposited coins are accumulated pending collection. An open front to the base chamber is normally closed by a door 26 which is hinged on a pin 28 at its upper end. A lock 30 at the lower end of the door is provided to safeguard the contents of the base chamber. A cylindrical collar 32 which depends from the casing base is provided with diagonally opposed slots 34 which engage a pin 36 extending transversely through a vertical supporting post 38 fitted within the collar. A cap screw 40 extends through a counter-bored opening in the bottom of the base C into a tapped opening in the post 38 to secure the meter casing thereto. It will be noted that the cap screw 40 is inaccessible to unauthorized parties as it cannot be reached unless the door 26 is first opened by operation of the lock 30.

Arcuate windows 42a and 42b are provided front and rear, oppositely of each other, near the top of the casing A and rear cover B to expose to view a scale indicating the time remaining, and a signal flag. Immediately below the front window 42a there is provided an opening 44 in the casing for receiving coins. A large opening 46 is provided in the front side of the casing, the size of this opening being sufficient for the passage therethrough of a winding handle 48 when its associated meter mechanism is to be installed within or be removed from the casing by movement through the open rear side thereof when the cover B is first taken off for this purpose. So that the last deposited coin may be viewed, a circular window 50 is provided in the front face of the casing beneath the large central opening 46.

Referring particularly to Figs. 1, 7 and 11, the meter mechanism is supported by circular vertical supporting plates 52, 54 and 56, which are held in spaced apart relation by tubular spacers such as 58. Cap screws, such as 60, extend through axial openings in the spacers 58 into tapped openings in the front wall of the casing. In addition to supporting plates 52, 54 and 56, the pair of cap screws 60 on the left side of the meter, as viewed in Fig. 1, also serve to support an arcuate coin chute 62, which includes a filler plate 64 and a pair of side plates 66 secured thereto.

At the upper end of the coin chute 62 there is provided a gate 68 (Fig. 10) which is pivoted on lugs 70 extending from the rear plate 66 and is biased by means of a helical spring 72 to seal the coin chute and to form a compartment 74 in which coins are held temporarily upon being deposited in the machine. The compartment 74 is provided with an opening in its front wall which is aligned with the opening 44 in the front wall of the casing.

At the lowermost end of the arcuate portion of the coin chute 62 there is provided a straight vertical portion 76 (Fig. 1) which is normally obstructed by a pin 78 extending through a slot in the rear plate 66 and attached to the lower end of an arm 80 pivoted at 82 on the rear side of the rear plate 66. The pin 78 serves to retain the last deposited coin in the vertical portion 76 of the coin chute, which portion is provided with an opening in its front side that is aligned with the circular window 50 in the front wall of the casing.

Referring particularly to Figs. 7, 8, and 11, the winding handle 48 is pinned to a shaft 84 which is journaled in a bushing 86 staked to the front supporting plate 52. A plated and polished escutcheon plate 88 is secured to the front side of the plate 52 by the bushing 86 to enhance the appearance of the meter and to provide protection against the elements. A coin carrier 90 is clamped to the other end of the shaft 84 and is biased to rotate in a counter-clockwise direction, as viewed from the left of Fig. 7, by means of a helical spring 91 which is pinned to the hub of the carrier 90 at one end, extends partially around the hub, and is pinned to the plate 52 at its other end. A stop pin 92 extending from the plate 52 limits the counter-clockwise movement of the carrier 90.

A pin 94 extends normally from the rear side of the carrier 90 to a point adjacent the plate 54 whereby to engage the free end of a winding arm 96, which extends from a hub 98 (Fig. 1) pinned to a sleeve 104 (Fig. 7), the latter being journaled on a stub shaft 100 extending from the plate 54.

The sleeve 104 is normally biased to rotate in a clockwise direction, as viewed from the left of Fig. 7, by a spiral spring 106 having a tongue at one end extending into an opening in the sleeve 104 and having a tongue at its other end which extends through an opening in a cup shaped casing 108. This casing is provided with lugs which extend through openings in the plate 54 to secure the casing thereto. A shallow cup-shaped resilient clutch plate 110 encompasses a flattened end portion of the sleeve 104 and is clamped thereto by means of a nut 112. The clutch plate 110 engages one face of a gear wheel 114 which is pinned to the shaft 100 journaled in the plate 56 and in the sleeve 104.

The gear wheel 114, which constitutes the great wheel of the timing mechanism, is coupled through a train of spur gears and pinions 118 to an escape wheel 120, all of which are attached to shafts which are journaled in the plates 54 and 56, as shown in Fig. 11. The escape wheel 120 is provided with circular notches 122 about its periphery, forming lugs 124 which are alternately engaged by a pair of pins 126 extending from a balance disk 128 secured to a shaft which is also journaled in the plates 54 and 56. The teeth of the escape wheel are small and are rounded or of scallop contour; they are also separated by notches which are curved and approximately semi-circular in contour so that the escape wheel, owing to its particular construction, presents at its periphery a substantial or extended continuity in the engaging surfaces. The scallop-teeth and curved notches in their retarding action permit the escape wheel to travel continuously in one direction or the other with complete rhythm which mechanically eliminates any shock to this delicate mechanical operation, thereby permitting the escapement to enjoy longer life and more perfect movement.

The torque at times impressed on the great wheel 114 by the spring 106 is transmitted through the gear train 118 to the escape wheel 120 and tends to rotate the latter wheel at high speed. The speed at which the escape wheel is able to rotate is limited by the inertia of the oscillating balance disk 128 and the spacing of the notches 122 in the escape wheel. Since the balance disk 128 does not form part of a resonant mechanical system, due to the omission of a hair spring or the equivalent, the speed at which the escape wheel rotates is a function of the torque transmitted through the gear train 118 from the spring 106. The fact that the speed at which the timing mechanism operates varies during a timing cycle is of small consequence in an application of this type, inasmuch as a fixed time interval is being measured and this time interval is unaffected by the variation in speed of the timing mechanism.

It is preferred that the spring 106 shall always be wound to a predetermined extent before the meter is set in operation, and that a slight additional winding shall take place at the time that the timing mechanism is set in operation, the timing mechanism functioning only for a period sufficient to permit the tension of the spring 106 to return to its original value. If the variation in the tension stored in the spring 106 at the start and at the finish of a time period is a relatively small portion of the total tension stored in the spring, the percentage variation in torque transmitted to the escape wheel 120 will be small, and hence it will rotate intermittently at a substantially uniform average speed.

Balance springs are delicate in construction and easily damaged when handled by inexperienced personnel, and furthermore are relatively costly items. Consequently, the elimination of a hair spring in the timing mechanism of the parking meter constitutes a considerable improvement by eliminating a likely source of difficulty in adjustment and maintenance and by reducing the original cost of the meter.

A horseshoe washer 130 (Fig. 7) engages a groove in the shaft 100 to form a shoulder against which an indicator arm 132 encompassing the shaft 100 is seated. A resilient shallow cup-shaped clutch plate 134 encompasses a flattened end portion of the shaft 100 and is clamped thereto by means of a nut 136 threaded on the shaft. The clutch disk 134 engages one face of the indicator arm 132 about the periphery of the clutch disk. At the upper end of the indicator arm 132 there is formed a pointer 132a (Fig 1) which is disposed adjacent the front side of a scale 138. This scale, which is calibrated on each side, is disposed between the windows 42a and 42b (Fig. 11) and is supported by the upper pair of cap screws 60. A second pointer 132b extends from the indicator arm 132 and is disposed on the opposite side of the scale 138.

A signal arm 140 (Figs. 1 and 11), pivoted on one of the spacers 58, carries a pair of flags 140a and 140b, which are normally disposed adjacent the centers of the windows 42a and 42b and are preferably colored red so as to be visible at a considerable distance from the meter. A cam arm 142 extends from the pivotal end of the arm 140 to engage a roller 144 secured to an ear extending from the indicator arm 132. The cam arm 142 is preferably arranged to move as a unit with the signal arm 140, but may be coupled thereto through gears or additional cams if desired. The signal arm 140 and the cam arm 142 connected therewith are biased to rotate in a clockwise direction, as viewed in Fig. 1, by means of a helical spring 146 which is pinned at one end to the hub of arm 140, extends part way around the hub, and is pinned to the scale 138 at its other end.

Figure 3:
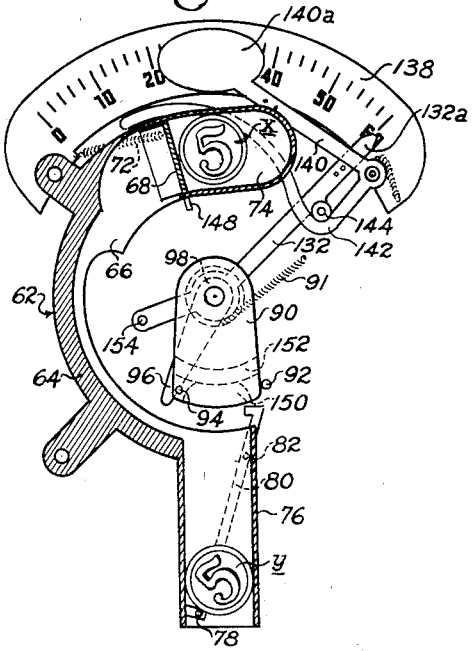
Figs. 3 through 6 are views, somewhat schematic in form, illustrating the sequence of operations which occur when the winding handle is operated and restored following the deposit of a coin in the meter.

The sequence of operations which takes place when the meter is set in operation will now be described with particular reference to Figs. 3 through 7. First, the motorist, to purchase a unit of parking time, inserts a suitable coin or token $x$ into the chamber 74 of the coin chute through the opening 44 (Figs. 1 and 11) in the meter casing. The bottom of the chamber 74 is slightly inclined whereby the coin $x$ is biased toward the gate 68 by gravity, as shown in Fig. 3. It will be noted that approximately one-half of the coin remains uncovered (Figs. 1 and 2) whereby it may readily be grasped and removed from the meter in the event that the motorist changes his mind before operating the winding handle 48.

After a coin has been deposited in the meter, the winding handle 48 is grasped by hand and rotated clockwise through an angle of approximately 140°. The carrier 90 is rotated clockwise with the winding handle 48 and causes the winding arm 96 to be rotated clockwise through the pin 94, thereby causing the spring 106 to be wound in the same direction. The clutch disk 110 rotates with the sleeve 104 and tends to carry the great wheel 114 of the timing mechanism with it; but, since the torque required to drive the timing mechanism at the speed with which the winding handle 48 is operated is far greater than that which can be transmitted from the clutch disk 110 to the great wheel 114 by the friction contact therebetween, the clutch slips and the great wheel 114 remains stationary.

Figure 4:
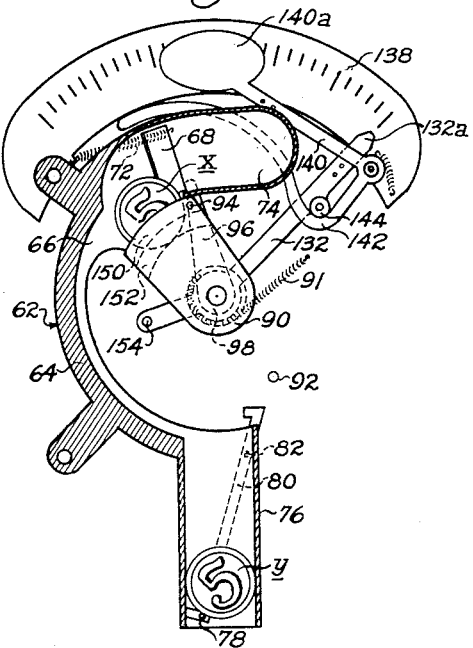

Near the end of the clockwise rotation of the carrier 90, the pin 94 extending therefrom strikes an arm 148 extending from the gate 68 to rotate the gate in opposition to the tension of spring 72 and thereby permit the coin $x$ to roll from the chamber 74 through the gate into a recess 150 provided in the end of the coin carrier, as shown in Fig. 4.

When the winding handle 48 is released, the coin carrier 90 restores in a counter-clockwise direction to its initial position, thereby carrying the coin $x$ in an arcuate path which terminates directly over the vertical portion 76 of the coin chute. The coin receiving recess 150 in the end of the carrier 90 communicates with an arcuate groove 152 (Fig. 9) in the rear side of the carrier, which groove is aligned with a pin 154 extending from an extension of the indicator arm 132.

Figure 6:
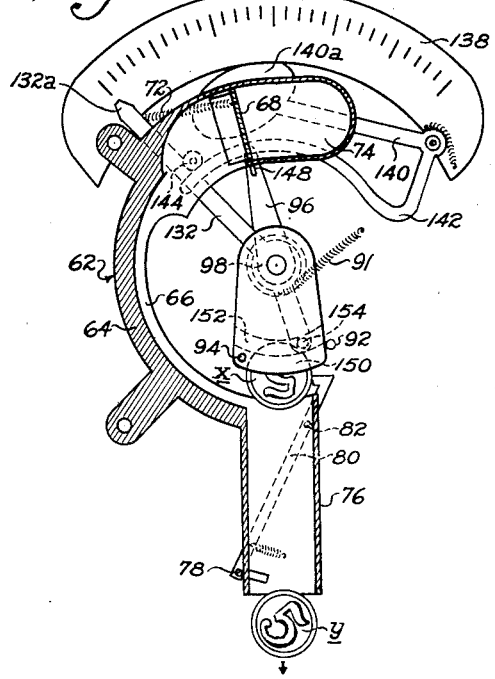
Figure 5:
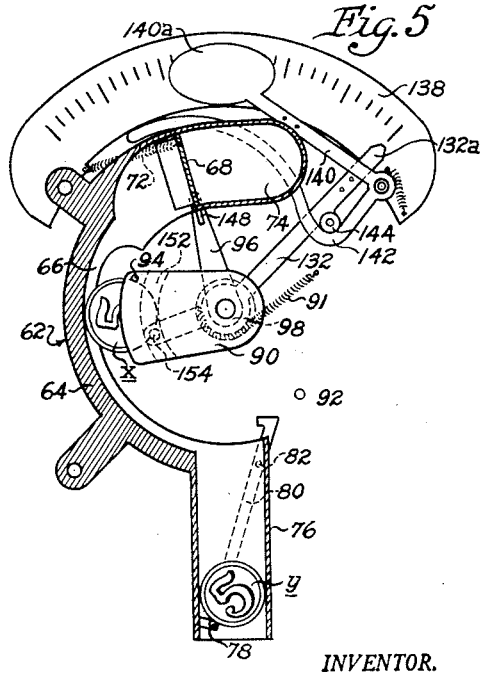

When there is no coin in the recess 150 of the coin carrier, the pin 154 is undisturbed during rotation of the carrier. However, when a coin is picked up by the carrier 90 at the upper end of its travel, the pin 154 will be engaged by the coin as the carrier returns to normal, as shown in Fig. 5, thereby causing the indicator arm 132 to be rotated counter-clockwise to the zero end of the scale 138, as shown in Fig. 6.

During this movement of the indicator arm 132, the shaft 100 and clutch disk 134 remain stationary, the torque required to rotate the shaft 100 at the speed with which the indicator 132 is being rotated being greatly in excess of that which can be transmitted through the friction clutch 134. Also during the counter-clockwise movement of the indicator arm 132, the roller 144 traverses the cam surface of the cam arm 142 to effect counter-clockwise rotation of the signal arm 140 and thereby shifts the flags 140a and 140b to a concealed position, as shown in Fig. 6.

When the carrier 90 returns to its normal position, the coin $x$ falls from the carrier through the vertical portion 76 of the coin chute. Before reaching the coin chute 76, the coin engages the upper end of the arm 80 to effect clockwise rotation thereof and thereby causes the pin 78 to be moved out of the path of the coin $y$ previously deposited in the meter, as shown in Fig. 6. The previously deposited coin $y$ then falls through an opening 156 (Fig. 11) into the coin box 24. A removable container 158 is preferably provided within the coin box to facilitate collection of the coins stored therein. As the fall of the coin $x$ which has just been deposited continues, the arm 80 restores to its normal position causing the pin 78 to catch the coin and hold it in a position where it is visible through the window 50 (Fig. 2) provided in the meter casing.

When the winding handle 48 is released, the pin 94 extending from the coin carrier is disengaged from the winding arm 96, thereby enabling the spring 106 to drive the shaft 100 in a clockwise direction, as viewed from the left of Fig. 7, through the sleeve 104, the clutch plate 110 and the great wheel 114. The gear train 118, escape wheel 120, and balance disk 128 act as a governor to limit the speed of the great wheel 114 to a substantially constant low value. Usually the timing mechanism is designed to hold the speed of the great wheel 114 to a value such that the indicator arm 132 rotates through an arc of approximately 90° in an hour's time. During this rotation of the shaft 100 by the spring 106, the pointers 132a and 132b traverse the scale 138, which is calibrated in terms of the time which has elapsed since the winding hand 48 was released.

The cam arm 142 is preferably formed so as to maintain the signal flags 140a and 140b concealed until the indicator arm 132 has neared the end of its travel, say five or ten minutes from the expiration of the interval when the total time is in the order of an hour. The cam arm 142 is shaped to permit the signal arm 140 to gradually restore to its initial position during the final movement of the indicator arm. The gradual reappearance of the flags 140a and 140b serves as a warning to the motorist that the time for which he has paid is about to expire. Although this fact could be ascertained by viewing the pointers 132a and 132b, the flags 140a and 140b are of considerably larger area and hence may be viewed from a much greater distance than the pointers, and therefore are better suited to provide a warning of the impending expiration of the parking time interval. The operation of the timing mechanism is stopped, when the indicator arm 132 has returned to its normal position, by the engagement of the winding arm 96 with the pin 94 extending from the coin carrier 90.

At periodic intervals the coins which have been deposited in the parking meters must be collected. With the meter shown in Fig. 11, the coin collector or agent inserts a key in the lock 30, opens it, and lifts the door 26 to remove the coin box 24 from the base chamber. The coins are dumped from the box into a suitable bag or satchel and the box is returned to the base chamber in which it again is locked. The collector may be tempted to pocket some of the coins since there is no record of the number of coins which have been deposited in the parking meter. It is difficult to detect such thefts, hence the importance of any satisfactory means for prevention of such a practice.

As an effective preventative for this purpose the device shown in Figs. 12 through 16 may be employed. In this case the coin box 158a is cast integrally with the door 26a which is hinged on the pivot pin 28a in such manner as to prevent removal of coins from the box through the opening by which they enter. The box 158a may be tapered toward the bottom where it is provided with a circular opening about which there is permanently attached a key controlled gate 160a.

The gate 160a comprises a cylindrical body portion 162a having a flange 164a extending therefrom and adapted to extend through the opening in the bottom of the box 158a and to be spun over to secure the gate thereto. A transversely slotted ear 166a which extends from one side of the body portion 162a of the gate is provided with a longitudinal circular opening for receiving the barrel portion 168a of a cylindrical lock of which the ear 166a forms the cylinder portion. Extending approximately one-half way around the inner wall of the body portion 160a there is provided a groove 172a (Fig. 15), which is aligned with and joins a slot 170a extending through the remaining half of the body portion 162a and through the ear 166a. A circular disk 174a is engaged in the groove 172a and the slot 170a about its peripheral margins and is provided with a tab or wing which extends through the slot in the ear 166a to encompass the barrel 168a to which the disk is secured by riveting, welding or the like. A series of tumblers 176a normally prevent rotation of the barrel 168a in the ear 166a, whereby the opening in the gate 160a is normally sealed by the disk 174a to prevent coins from being removed from the box 158a to which the gate is affixed.

A similar key controlled gate 180a, including a body portion 182a, a flange 184a, and a transversely slotted ear 186a forming part of a cylindrical lock including a barrel portion 188a, is arranged to mate with the gate 160a. The body portion 182a is also provided with a groove 192a (Fig. 15) extending half way around the inner wall thereof and aligned with and joining a slot 190a extending through the other half of the body portion and the ear 186a. Within this slot and groove there is disposed a disk 194a provided with a tab or wing which extends into the slot in the lug 186a and encompasses the barrel portion 188a to which it is secured by riveting, welding or the like. Tumblers 196a, disposed in aligned openings in the barrel portion 188a and the inner wall of the lug 186a, normally prevent rotation of the barrel portion relative to the body portion of the gate. A flange 200a depends from the body portion 182a into the end of a flexible tube 202a, which may be secured to the flange by soldering, brazing or the like, and which extends to or forms part of a suitable portable coin box (not shown).

The gate 160a includes a key 178a adapted to unlock the corresponding gate 180a; this key is secured to and carried by the barrel portion 168a of the gate 160a. Similarly, the gate 180a is provided with a key 198a which is adapted to fit the lock of the other gate 160a, this latter key being secured to and carried by the barrel portion 188a of the gate 180a. In order to remove the coins from the coin box 158a, the collector fits the two gates 160a and 180a together, as shown in Figs. 12 and 16. When this is done the keys 178a and 198a then operate the tumblers 176a and 196a to positions which permit rotation of the barrel portions 168a and 188a by means of a handle 204a extending from the barrel portion 188a. Rotation of the handle 204a causes the disks 174a and 194a to be swung out from the body portions of the gates through the slots 170a and 190a in the sides thereof, thereby permitting coins to pass from the coin box 158a through the gates and the tube 202a to the portable receptacle or container carried by the collector.

It will be noted that as soon as the barrel portions 168a and 188a are rotated from their normal positions it is impossible for the tumblers 176a and 196a to move in a radial direction, since their outermost ends will then abut the inner walls of the lugs 166a and 186a. As these tumblers are in locking engagement with the notches in the keys 178a and 198a, it is impossible to withdraw the gate 180a from the mating gate 160a when they are open, thus the gates can never be opened unless they are connected, as shown in Fig. 12, whereby to preclude any possibility of the collector obtaining access to the coins at any time.

It should now be apparent, that by reason of the novel constructional features of the invention whereby the indicator and flag are reset in response to the dumping of a deposited coin in the meter, a substantially fool-proof apparatus has been provided which precludes cheating by the motorist and yet is simple and economical in construction. The positive operation of the signal flag by means of the direct coupling between the indicator and the flag assures exact synchronism therebetween and eliminates any possibility of argument as to the point in the parking period at which the signal flag has become visible. This is a factor tending to prevent disputes regarding alleged overtime parking.

It should also be apparent that, through the use of the improved timing mechanism disclosed herein, a parking meter has been provided which can be simply and economically manufactured and which requires a minimum amount of adjustment and maintenance.

The novel arrangement for preventing the coin collector or agent from obtaining access to the coins which he collects from the meters constitutes a great improvement which can be gainfully employed in any system where it is required that the accumulated coins be collected from time to time, such as with installations of telephone, vending machines, and the like.

While a particular embodiment of the invention has been disclosed and described by way of illustration, it should be apparent that various modifications may be made therein without departing from the invention in its broader aspects, and therefore the aim of the appended claims is to cover all such modifications as fall within the true spirit and scope of the invention.

Having thus described the invention, what is claimed as new and desired to be secured by Letters Patent is:

1. In a coin controlled mechanism, a housing enclosing the mechanism and having a coin receiving opening, a substantially oblong compartment communicating at one side with said opening and at the other side presenting a closed wall to the coin opening, said compartment communicating with a coin chute forming part of the mechanism, a normally closed gate sealing said compartment to exclude dust and dirt from the mechanism, and coin carrier means engageable with said gate for momentarily opening said gate when the mechanism is set in operation to admit a coin deposited in said compartment to said coin chute, said coin carrier means being engageable with the coin and movable to effect movement of the coin along said chute.

2. In a manually operated coin controlled mechanism, a housing enclosing the mechanism and having a coin receiving opening, means forming a compartment communicating with said opening and disposed transversely of the same and extending at one end laterally beyond said coin opening and normally sealed from the mechanism, a coin chute forming part of the mechanism extending from the opposite end of said compartment in arcuate alignment with the same, manually operable means for actuating said mechanism, and coin carrier means responsive to the operating of said last means for opening said compartment to admit a coin deposited therein to said chute, said coin carrier means being engageable with the coin and movable to effect movement of the coin along said chute.

3. In a parking meter, a pointer and a scale for indicating the expired portion of a parking time interval, a signal flag movable between a visible and a concealed position, a timing mechanism operative to advance said pointer across said scale, and means coupling said signal flag to said pointer throughout the entire movement of the latter for gradually moving the flag from the concealed to the visible positions during the advancement of said pointer over the final portion of the scale.

4. In a parking meter, a pointer and a scale for indicating the expired portion of a parking time interval, a signal flag movable between a visible and a concealed position, a timing mechanism operative to advance said pointer across said scale, and means coupling said signal flag to said pointer throughout the entire movement of the latter for moving the flag from the concealed to the visible positions before the pointer reaches a position indicating the expiration of the parking time interval, whereby to provide a warning of the impending expiration of the time interval.

5. A coin-controlled mechanism comprising a coin receiving opening, a coin chute, a compartment disposed transversely of and communicating at one side with the opening and presenting a closed wall at the opposite side of the opening and inclined downwardly toward the chute for communication therewith, a normally closed gate sealing off said compartment to exclude dust and dirt from the mechanism and providing an abutment against which a vertically standing coin will tend to rest, and coin carrier means movable for engagement with said gate for opening the gate when the mechanism has been set in operation to admit to the coin chute a coin previously deposited in the compartment, said coin carrier means being engageable with the coin and movable to effect movement of the coin along said chute.

6. A coin-controlled mechanism comprising a coin receiving opening, a coin chute, a compartment disposed transversely of and communicating at one side with the opening and presenting a closed wall to the opening at the opposite side thereof and communicating with the coin chute and inclined downwardly toward the latter, a normally closed gate sealing off the compartment to exclude dust and dirt from the mechanism and providing an abutment against which a vertically standing coin may rest in a position opposite the receiving opening permitting the coin to be extracted therethrough, and coin carrier means movable for engagement with said gate for opening the gate when the mechanism is set in operation to admit to the coin chute a coin previously deposited in the compartment, said coin carrier means being engageable with the coin and movable to effect movement of the coin along said chute.

7. A coin-controlled mechanism comprising a circular coin-receiving opening of a size to receive a proper coin, a stationary compartment disposed transversely of and extending at one end beyond and communicating with the opening, a normally closed gate sealing off the compartment to exclude dust and dirt from the mechanism and operating, when opened, to admit a coin therethrough, and means for opening the gate comprising a coin carrier movable to a position adjacent the gate for opening the same and for receiving therein a coin released therethrough, the carrier when moved away from the gate operating to conduct the coin to a point of discharge.

8. A parking meter having a coin-controlled mechanism comprising a coin-receiving opening, a compartment communicating with the opening and with a coin chute forming part of the mechanism, a normally closed movably mounted gate sealing off the compartment to exclude dust and dirt from the mechanism, and means for opening the gate comprising a carrier provided with means for engaging and opening the gate and movable to a position adjacent the gate for receiving the coin released therethrough, the carrier when moved away from the gate operating to conduct the coin to a point of discharge, a scale, a pointer movable across the scale, and an operative connection between the carrier and pointer and directly engaged and operated by a deposited coin and such as to set the pointer in a predetermined position when the carrier is moved to the point of coin discharge.

9. In a parking meter, a pointer and a scale for indicating the expired portion of a parking time interval, a signal flag movable between visible and concealed positions, a timing mechanism operative to advance the pointer across the scale, and means coupling the signal flag to the pointer for gradually moving the flag from the concealed to the visible position during advancement of the pointer over the final portion of the scale, comprising an arm extended from the signal, means on the pointer in sliding engagement with the arm lengthwise thereof, the arm being contoured endwise to maintain the signal in a single position while the pointer advances across a major part of the scale and thereafter to release the signal for movement to its exposed position, and a spring for moving the signal to its exposed position.

10. In a parking meter, a pointer and a scale for indicating the expired portion of a parking time interval, a signal flag movable between visible and concealed positions, a timing mechanism operative to advance the pointer across the scale, and cam means extending lengthwise of the flag and operating to couple the signal flag to the pointer throughout the entire movement of the latter for gradually moving the flag from its concealed to its visible position during advancement of the pointer over a minor portion of the scale.

11. In a parking meter, a pointer and a scale for indicating the expired portion of a parking time interval, a signal flag movable between visible and concealed positions, a timing mechanism operative to advance the pointer across the scale, and means coupling the signal flag to the pointer for controlling movement of the former and operative through most of the pointer movement to maintain the signal flag in its concealed position and through the balance of the pointer movement to release the signal for a gradual movement to its visible position.

ROBERT F. BROUSSARD.

REFERENCES CITED

The following references are of record in the file of this patent:

UNITED STATES PATENTS

| Number | Name | Date |
|---|---|---|
| 467,146 | Beasley | Jan. 19, 1892 |
| 584,586 | Gribbel | June 15, 1897 |
| 1,126,751 | Goldberg | Feb. 2, 1915 |
| 2,096,155 | Breeden | Oct. 19, 1937 |
| 2,118,318 | Magee | May 24, 1938 |
| 2,271,953 | Rhodes | Feb. 3, 1942 |
| 2,285,532 | Rockola | June 9, 1942 |
| 2,304,012 | Neff | Dec. 1, 1942 |
| 2,308,836 | Sisk | Jan. 19, 1943 |
| 2,408,998 | Rhodes | Oct. 8, 1946 |
| 2,431,395 | Godley | Nov. 25, 1947 |

FOREIGN PATENTS

| Number | Country | Date |
|---|---|---|
| 211,976 | Switzerland | Feb. 3, 1941 |